United States Patent
Bentgen et al.

(10) Patent No.: US 10,392,089 B2
(45) Date of Patent: Aug. 27, 2019

(54) CONTRA-ROTATING PROPULSOR FOR MARINE PROPULSION

(71) Applicant: Michigan Marine Propulsion Systems, LLC, Ann Arbor, MI (US)

(72) Inventors: Bernard Bentgen, Dexter, MI (US); Brant Savander, Dexter, MI (US)

(73) Assignee: MICHIGAN MARINE PROPULSION SYSTEMS, LLC, Ann Arbor, MI (US)

( * ) Notice: Subject to any disclaimer, the term of this patent is extended or adjusted under 35 U.S.C. 154(b) by 563 days.

(21) Appl. No.: 15/276,173

(22) Filed: Sep. 26, 2016

(65) Prior Publication Data

US 2017/0137100 A1    May 18, 2017

Related U.S. Application Data

(62) Division of application No. 14/208,762, filed on Mar. 13, 2014, now Pat. No. 9,452,815.

(Continued)

(51) Int. Cl.
*B63H 5/10* (2006.01)
*B63H 11/00* (2006.01)
(Continued)

(52) U.S. Cl.
CPC ............ *B63H 11/00* (2013.01); *B63H 5/10* (2013.01); *B63H 23/02* (2013.01); *B63H 23/06* (2013.01); *B63H 23/24* (2013.01); *B63H 23/28* (2013.01); *B63H 23/30* (2013.01); *B63B 2035/738* (2013.01); *B63H 2005/106* (2013.01); *B63H 2021/202* (2013.01);
(Continued)

(58) Field of Classification Search
CPC ............ B63H 5/08; B63H 5/10; B63H 11/00
See application file for complete search history.

(56) References Cited

U.S. PATENT DOCUMENTS 3,356,150 A * 12/1967 Ruszczycky ............ F42B 19/01
                                                          114/23
4,132,131 A    1/1979 DeBruyne
(Continued)

FOREIGN PATENT DOCUMENTS

JP    59096092 A    6/1984
JP    62139790 A    6/1987
(Continued)

*Primary Examiner* — Stephen P Avila
(74) *Attorney, Agent, or Firm* — Brinks Gilson & Lione

(57) ABSTRACT

A system for providing marine propulsion is provided including an input shaft driven by a prime mover, a pinion gear coupled to the input shaft, a plurality of planet gears coupled to the pinion gear, a planet carrier having the plurality of planet gears rotationally mounted thereto, and a ring gear surrounding the planet gears and coupled thereto. The planet carrier and ring gear are coupled to internal and external output shafts that are coaxially aligned, which are coupled to aft and forward propulsor elements. The ring gear and planet carrier rotate in opposite directions to provide contra-rotating forward and aft propulsor elements. The ring gear and planet gear are each coupled to rotation altering devices that, when at least one is activated, the rotation of both the planet carrier and ring gear will be altered, thereby altering the rotation of the propulsor elements.

13 Claims, 13 Drawing Sheets

Related U.S. Application Data

(60) Provisional application No. 61/789,176, filed on Mar. 15, 2013.

(51) Int. Cl.
*B63H 23/06* (2006.01)
*B63H 23/30* (2006.01)
*B63H 23/24* (2006.01)
*B63H 23/28* (2006.01)
*B63H 23/02* (2006.01)
*B63B 35/73* (2006.01)
*B63H 21/20* (2006.01)

(52) U.S. Cl.
CPC ............... *B63H 2023/0283* (2013.01); *B63H 2023/062* (2013.01); *B63H 2023/065* (2013.01); *B63H 2023/067* (2013.01); *B63H 2023/245* (2013.01); *Y02T 70/5236* (2013.01); *Y02T 70/56* (2013.01)

(56) References Cited

U.S. PATENT DOCUMENTS

| | | |
|---|---|---|
| 4,997,414 A | 3/1991 | Camara et al. |
| 5,030,149 A | 7/1991 | Fujita |
| 5,083,989 A | 1/1992 | Yates et al. |
| 6,186,922 B1 * | 2/2001 | Bursal ............... F16H 25/06 475/221 |
| 8,105,199 B2 | 1/2012 | Okabe |
| 2008/0058149 A1 * | 3/2008 | Yang ............... F16H 48/36 475/230 |
| 2010/0003871 A1 * | 1/2010 | Wishart ............ B63H 5/10 440/6 |
| 2010/0237822 A1 * | 9/2010 | Hiramoto ............ H02K 21/046 318/718 |

FOREIGN PATENT DOCUMENTS

| | | |
|---|---|---|
| JP | 64001691 A | 1/1989 |
| JP | 2-212293 A | 8/1990 |
| JP | 5-32196 A | 2/1993 |
| JP | 6-56083 A | 3/1994 |
| RU | 2 182 098 C1 | 5/2002 |
| WO | 97/49604 A1 | 12/1997 |

* cited by examiner

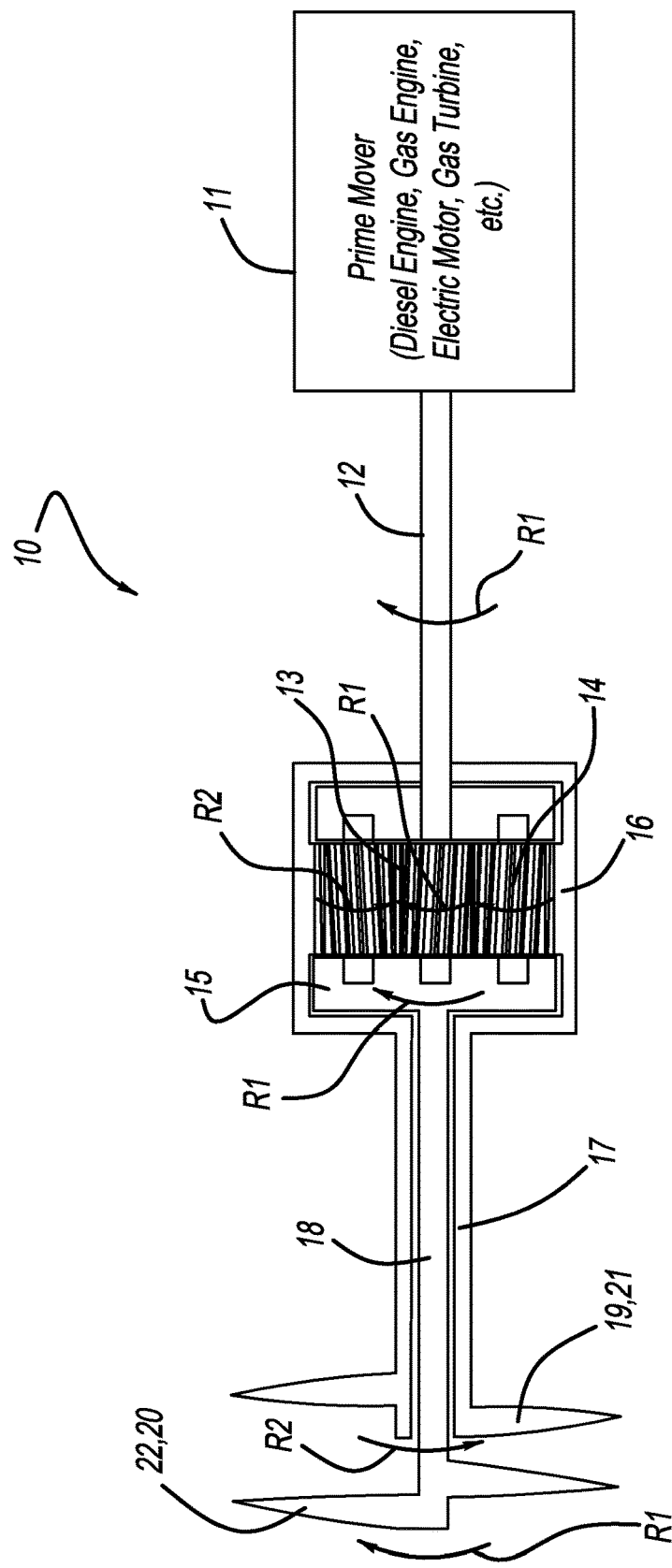
FIG-1.1

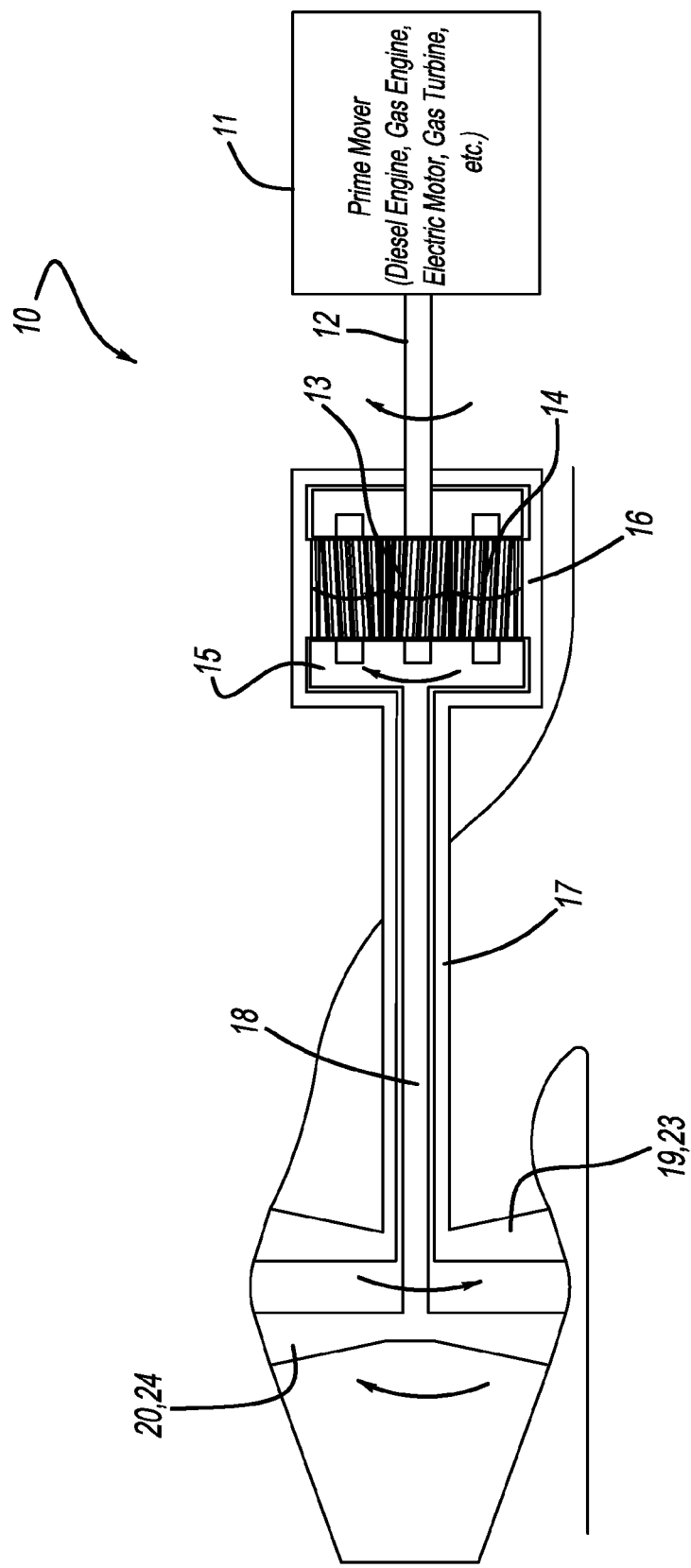
FIG-1.2

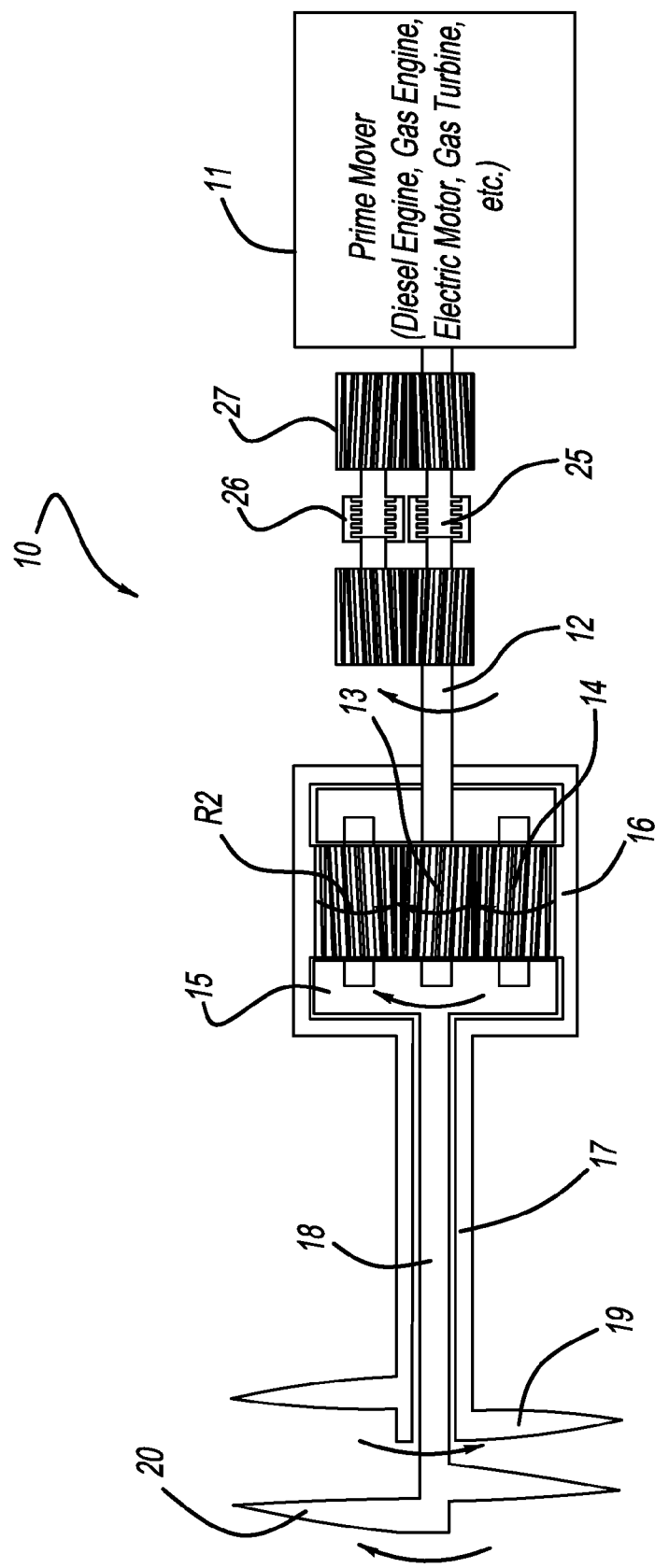
FIG-2.1

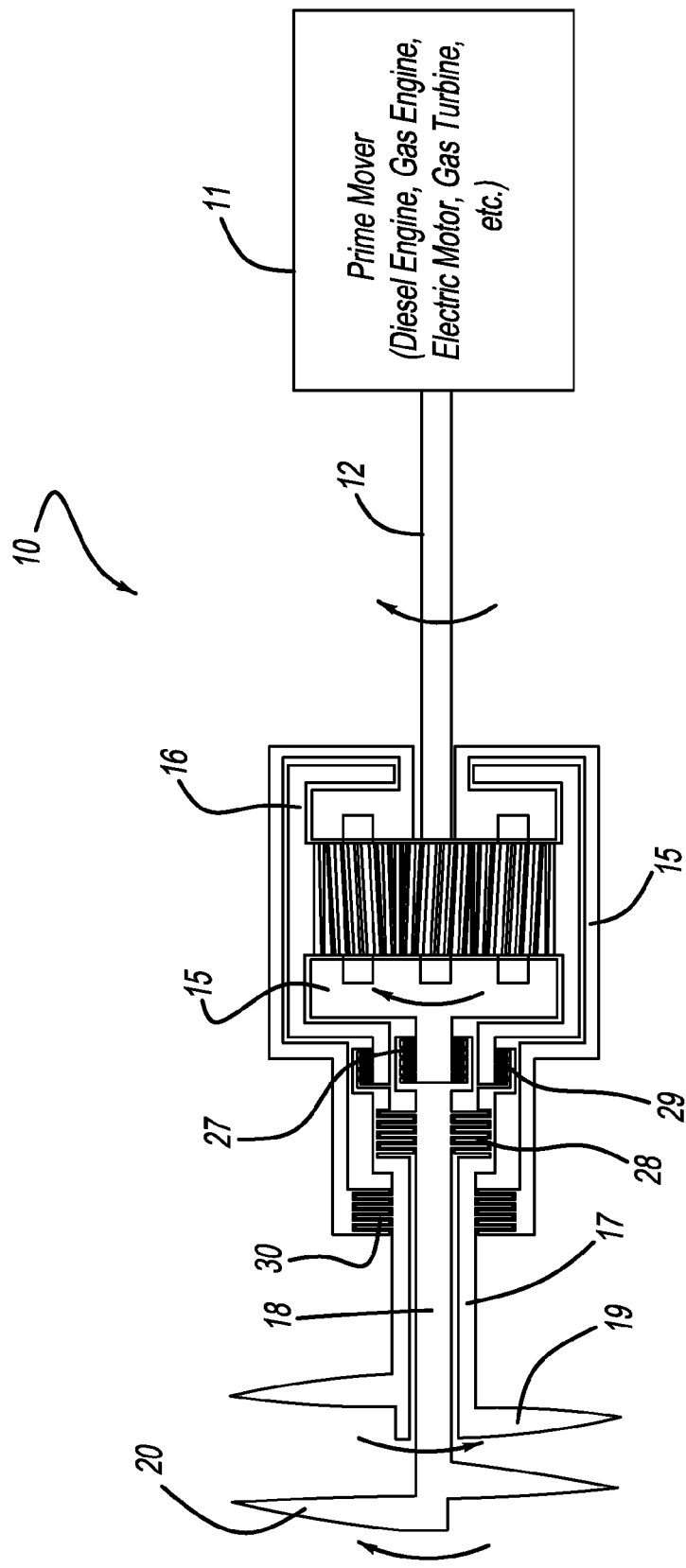
FIG-2.2

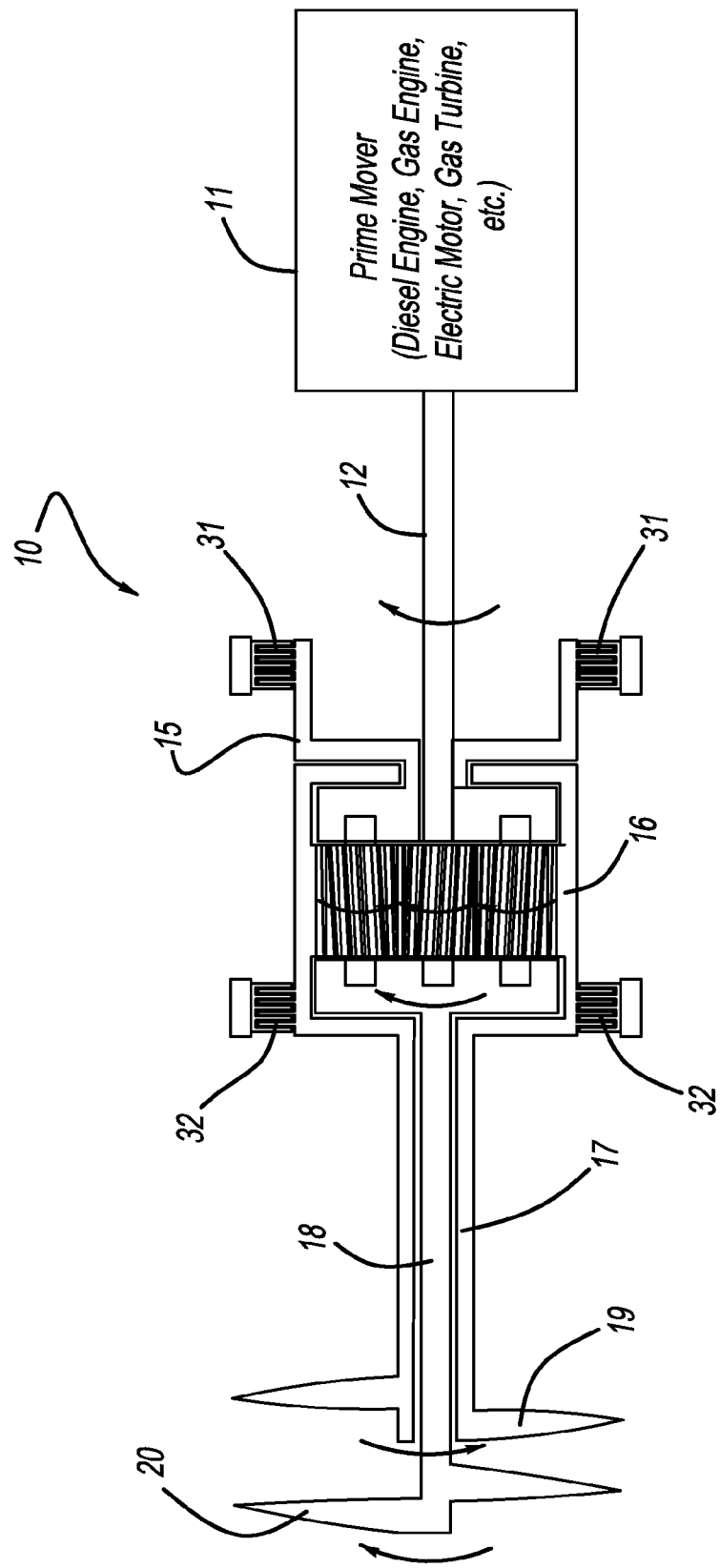
FIG-3.1

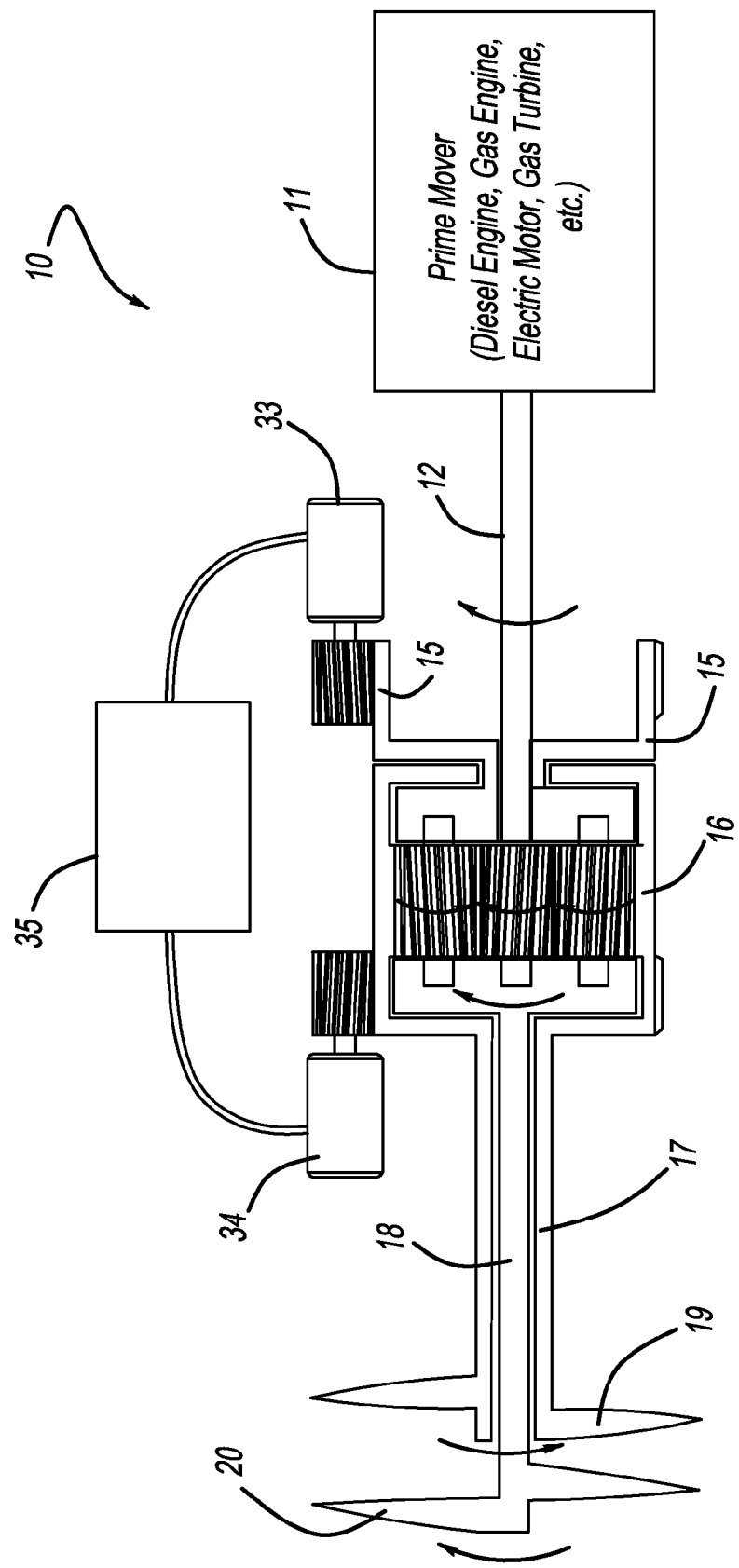
FIG-3.2

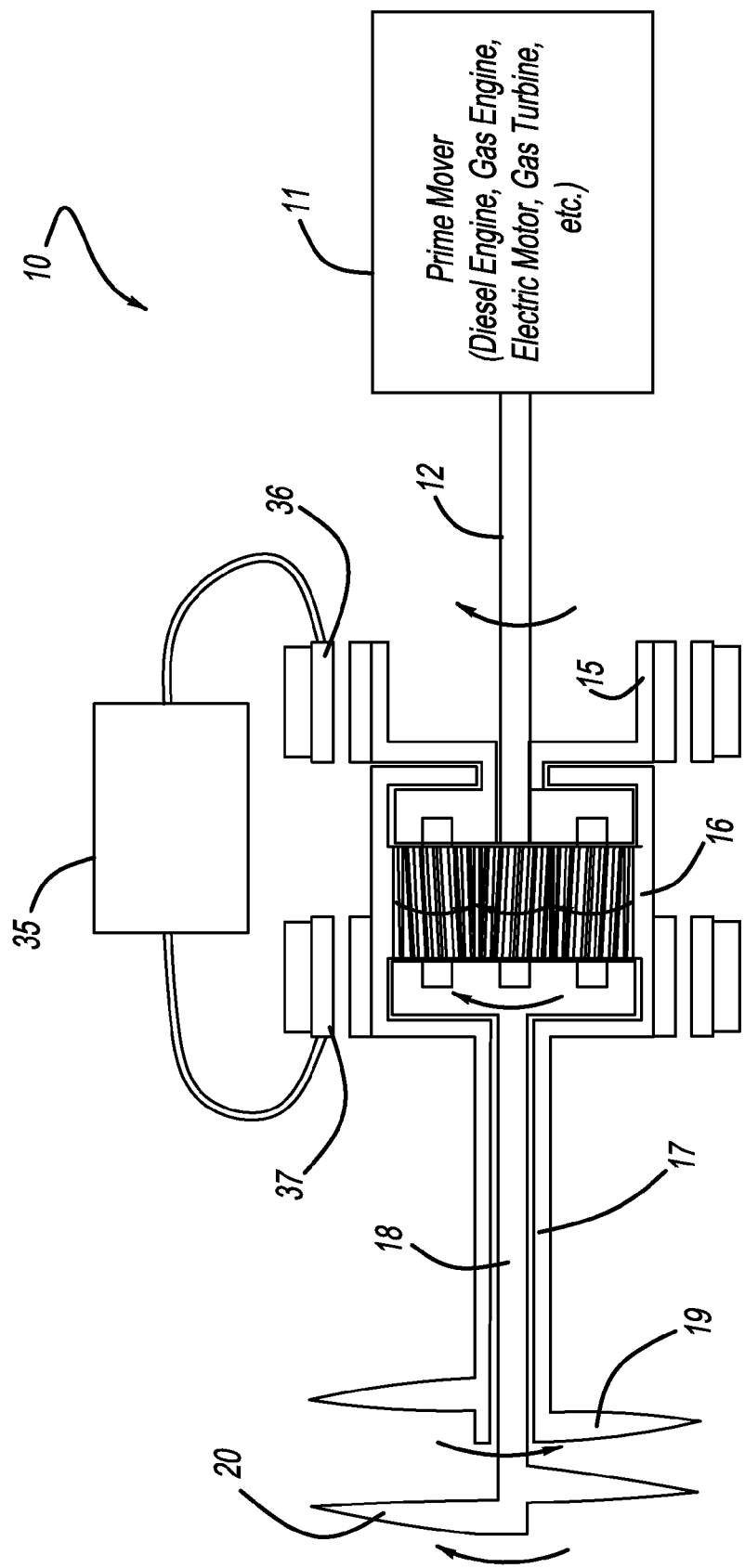
FIG-3.3

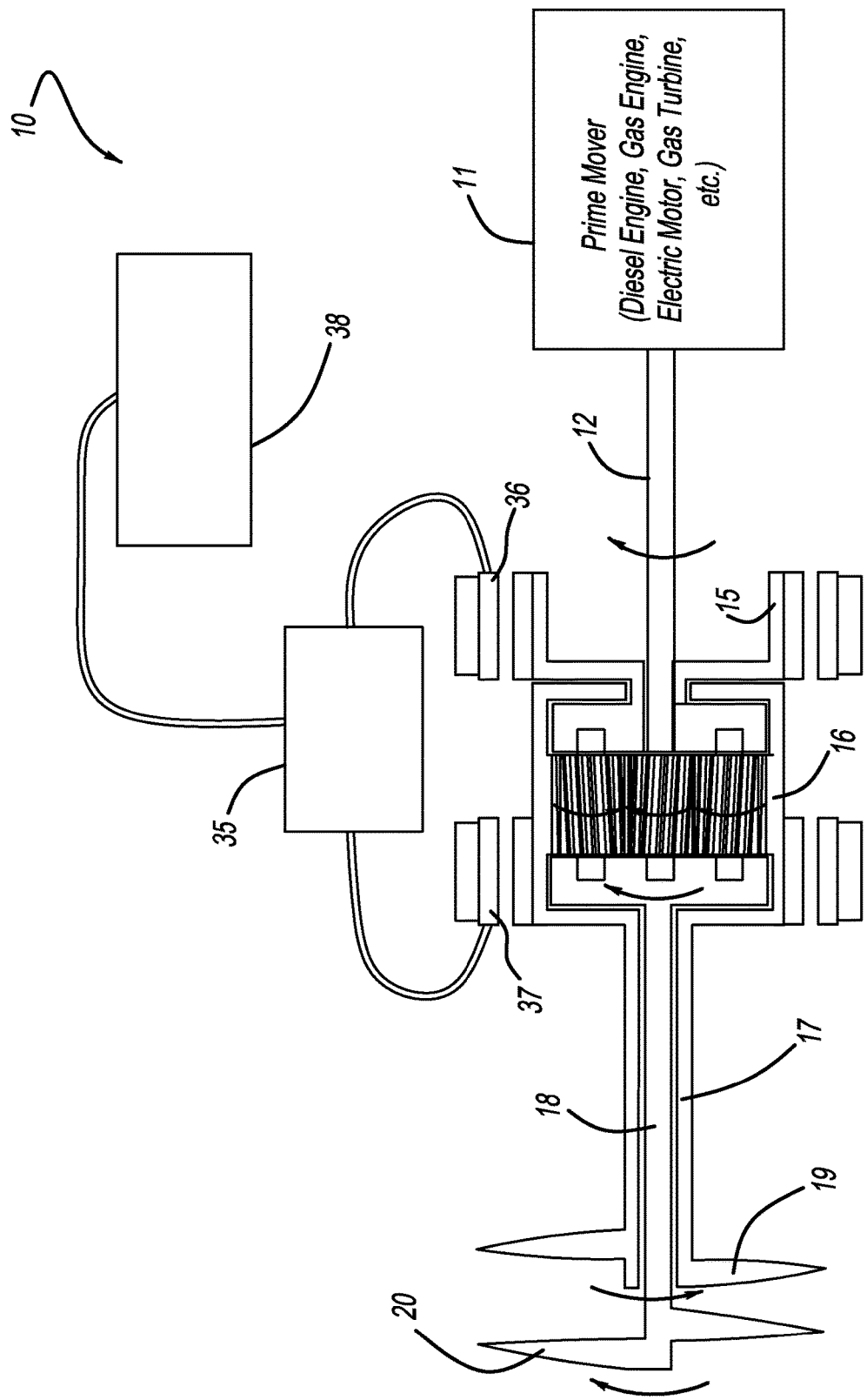
FIG - 3.4

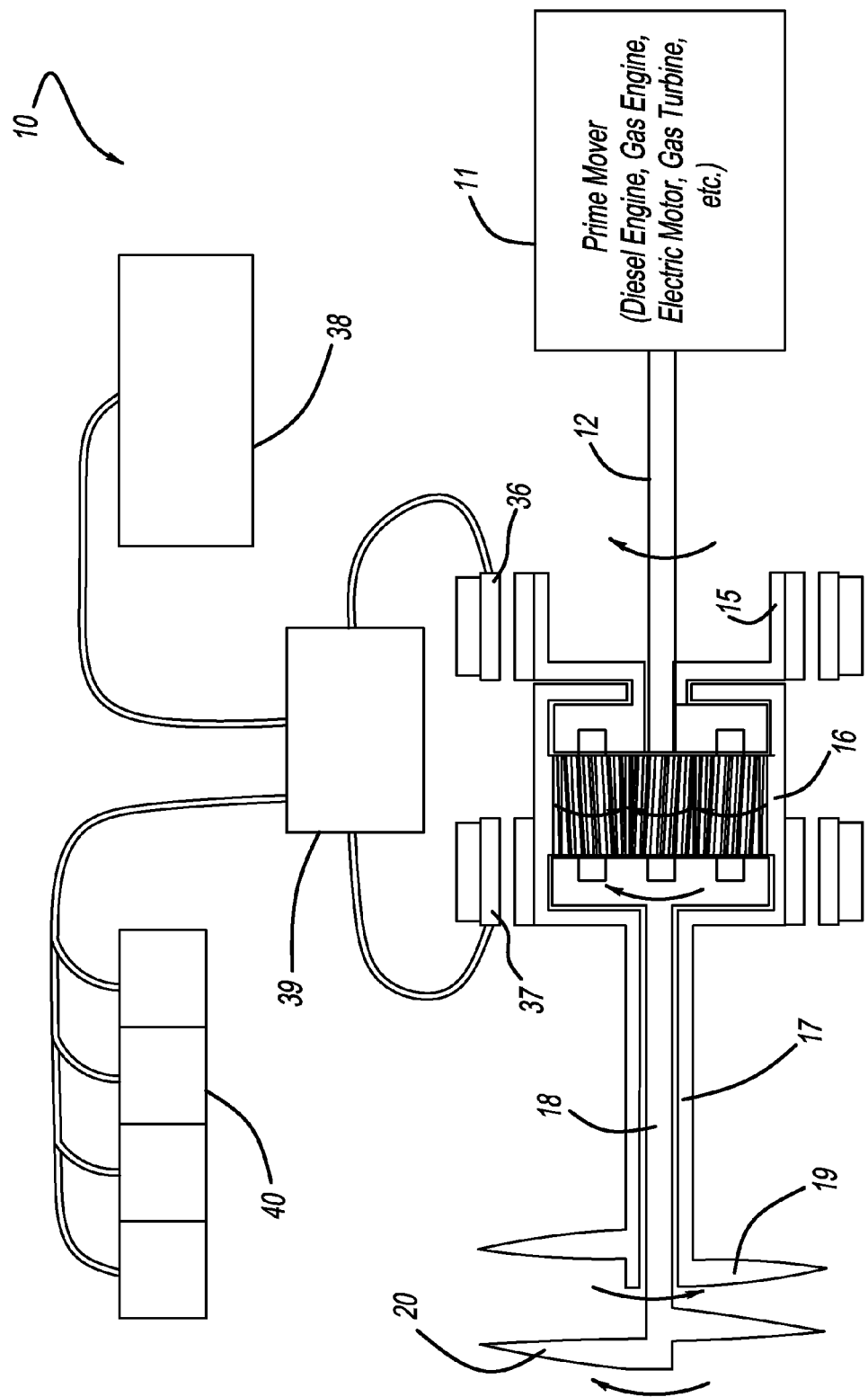
FIG-3.5

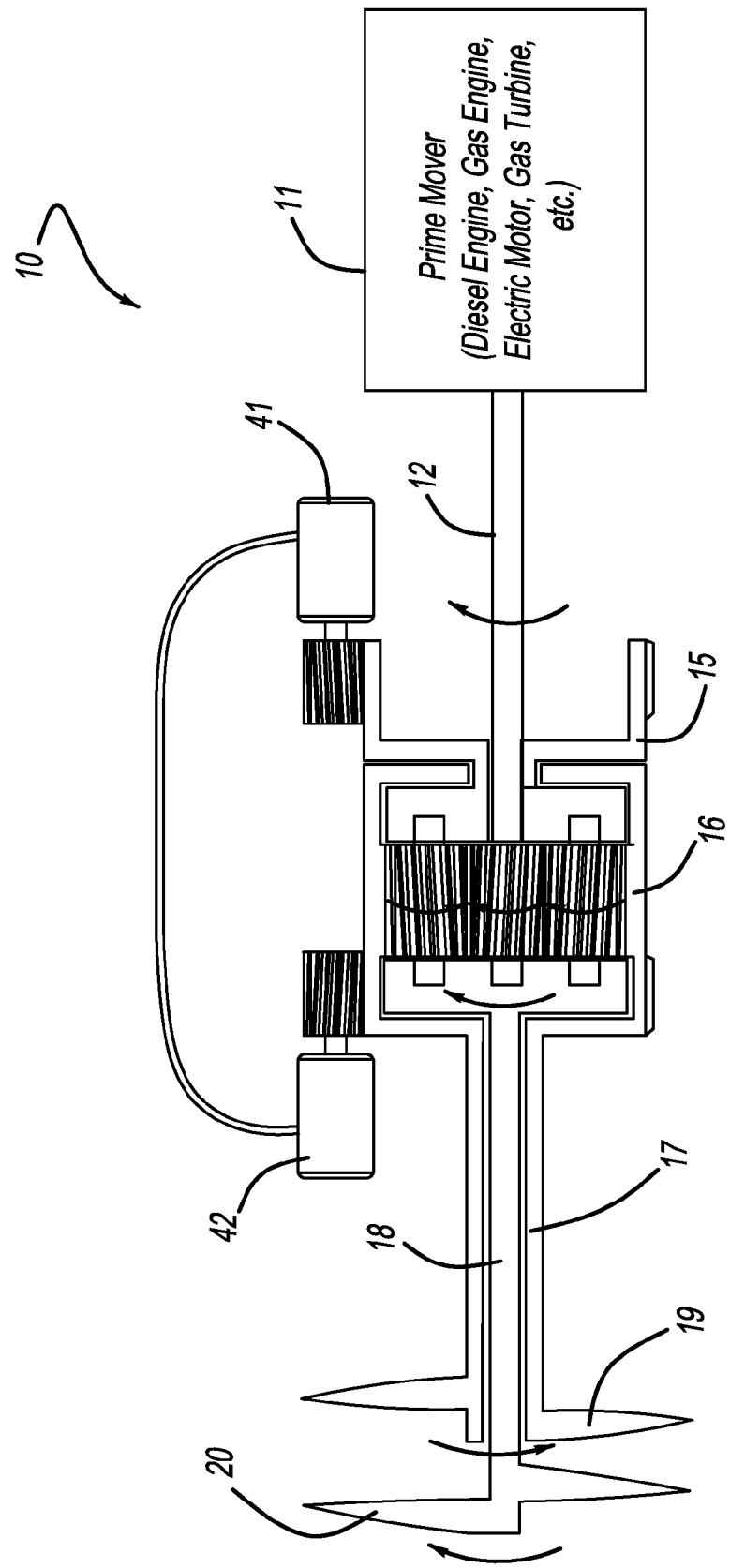
FIG-3.6

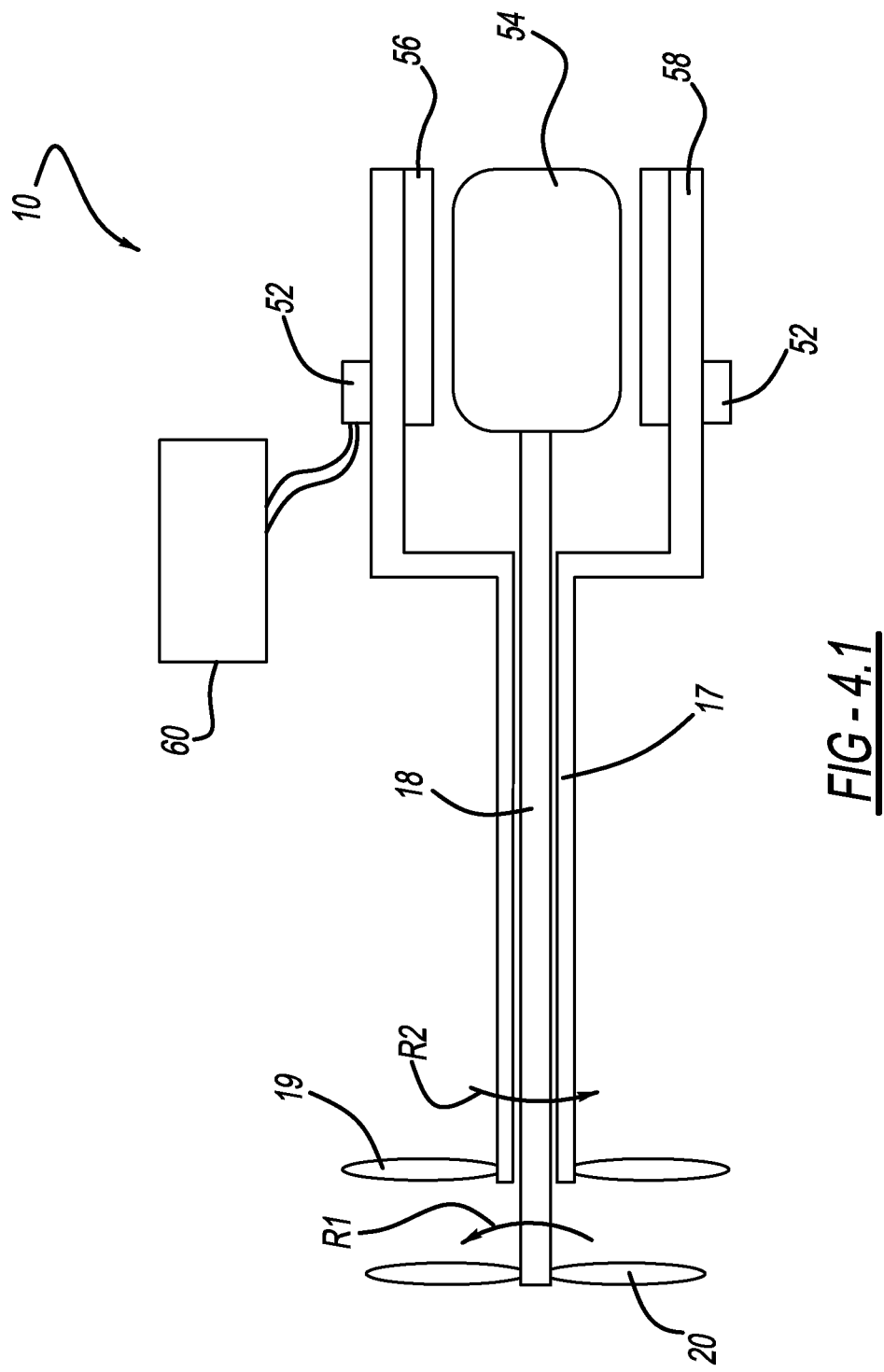
FIG-4.1

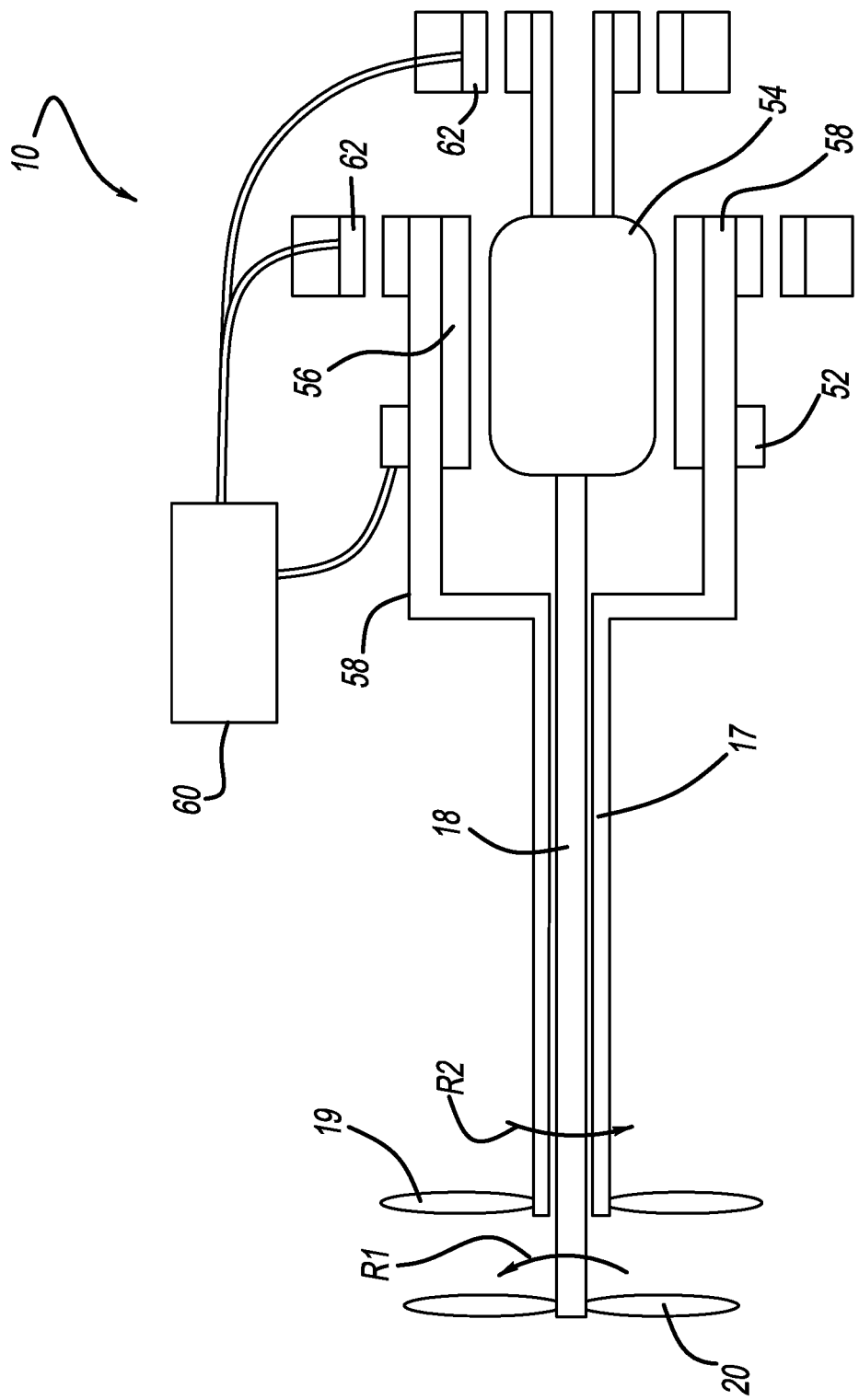
FIG-4.2

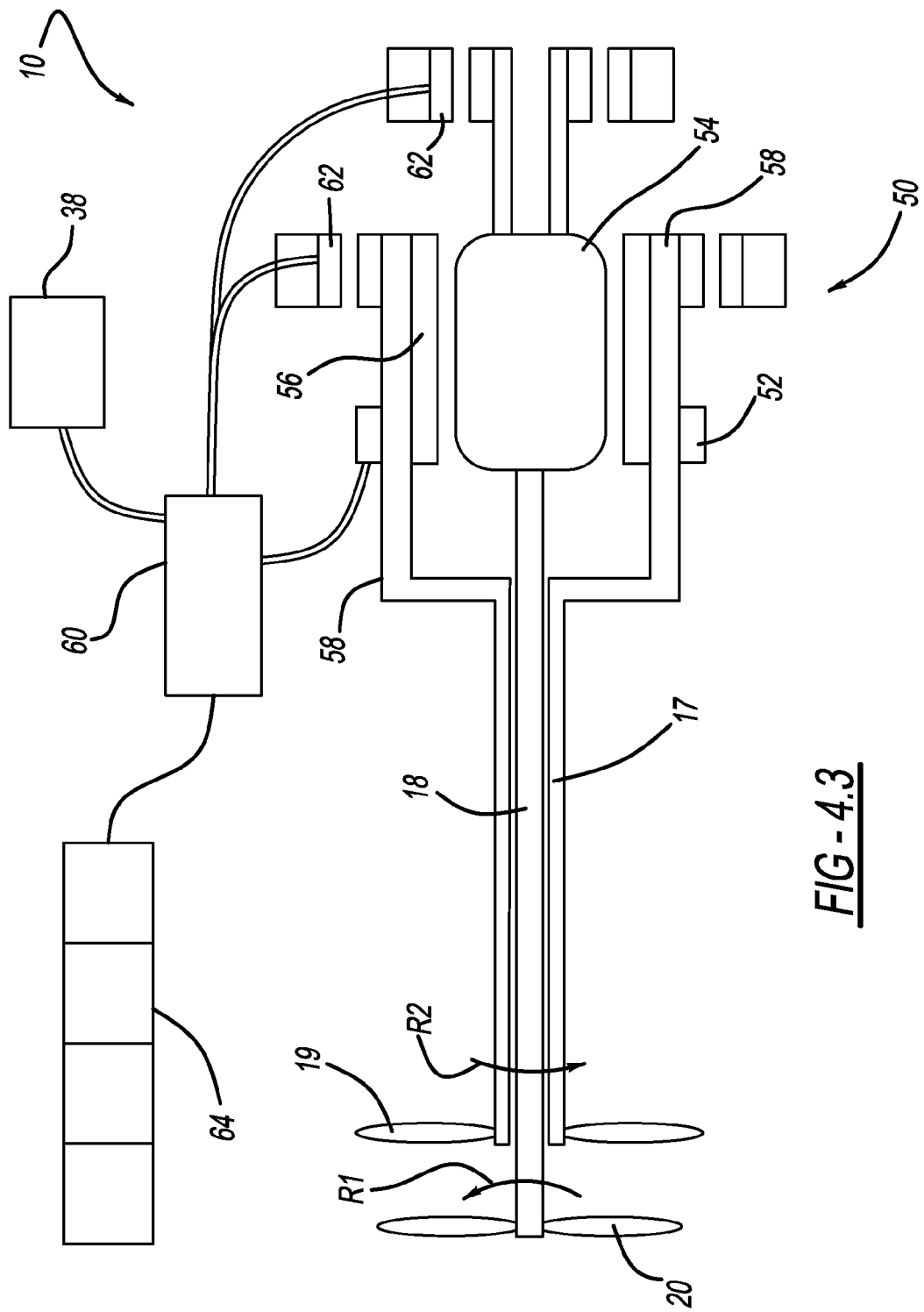
FIG-4.3

CONTRA-ROTATING PROPULSOR FOR MARINE PROPULSION

CROSS-REFERENCE TO RELATED APPLICATIONS

This application is a divisional of U.S. patent application Ser. No. 14/208,762, filed on Mar. 13, 2014, which claims the benefit of U.S. Provisional Patent Application No. 61/789,176, filed Mar. 15, 2013, both of which are hereby incorporated by reference in their entirety.

BACKGROUND

Marine or ship propulsion has been achieved in a variety of ways over time, including the use of propulsor elements such as propellers or waterjet impellers. Some of the primary challenges in designing a ship propulsion system include the matching of the propulsor elements (propellers or waterjet impellers) to the characteristics of the hull form, mission requirements, and the characteristics and limitations of the prime movers (e.g. diesel engines, gas turbines, electric motors). This is further complicated by the need to "balance" the performance of the system over the operating range of the prime mover.

Historically, ship propulsion systems have been optimized to address a key performance point for the application. For example, Ship Assist Tugs are normally optimized to maximize stationary pulling power, referred to as Bollard Pull, but in reality spend relatively little of their duty cycle at this operating point.

Sports fishing boats and Military Patrol Boats on the other hand are normally optimized for top-end speed. Accordingly, the most efficient and affordable installations have prime movers, reduction gears, and fixed pitch propellers or waterjets that are selected to maximize this desired performance characteristic, and most often sacrificing better performance at "off-design" operating point where they spend most of their time.

Examples of prior art that attempt to address this conundrum include the implementation of Controllable/Reversible Pitch Propellers and the implementation of electric drive systems.

The former is a common attempt at solving this problem but the trade-offs are: higher system acquisition cost; propeller blade shape that is optimized for top speed or Bollard Pull characteristics but is less efficient when operating outside this range; and larger propeller propulsor hub size with corresponding reduced overall efficiency.

The use of electric drives has the trade-off of being significantly higher in acquisition cost and has a lower operating efficiency over the entire operating range as a result of the mechanical-to-electrical power conversion.

An additional and more substantial challenge has been identified in Naval Ship applications. Worldwide, these Naval Ships have evolved into faster, smaller, more agile vessels, capable of operating at higher speeds in shallower coastal environments. Examples include the US Navy's Littoral Combat Ship and Joint High Speed Vessel. These are smaller, high horsepower ships capable of achieving speeds in excess of 35-40 knots. Prior art in the form of conventional single-impeller waterjets has been significantly challenged to "get the horsepower into the water" without causing destructive cavitation and without exceeding the space available on the transom of a narrow, high speed hullform.

Prior attempts to address this challenge using planetary gears with free rotation of planet carriers and ring gears to produce a contra-rotating propulsor fall short in their ability to maximize the efficiency of the system. Prior solutions impose a restraining element on only one or the other of the two output elements (planet carrier or ring gear, but not both) and offer no provision for "redistributing" this restraining energy back into the system.

BRIEF SUMMARY

The proposed invention improves upon this prior art by offering a system that uses the efficiency of fixed pitch contra-rotating propulsors but provides the ability to "adjust" or "balance" the system to improve efficiency over the entire operating range of the prime mover.

The proposed invention, when configured as a waterjet with contra-rotating impellers, addresses the challenge of "getting horsepower in the water" by allowing the two impellers to be designed to increase flow through the waterjet without incurring the negative effects of cavitation and at the same time allowing equivalent or greater thrust to be developed using smaller diameter impellers (which consumes less transom real estate).

The proposed invention not only provides for this energy recovery, but by doing so, also provides a system that is immediately adaptable to a more flexible "Hybrid" configuration thereby further improving overall system efficiency and reduced fuel consumption.

The invention includes a device or system consisting of planetary gears; shafting; clutches; hydraulic or electric pumps, motors, and/or generators; and propelling devices (propellers or waterjets) that can be used in a contra-rotating arrangement to propel a boat or ship through the water.

A first embodiment of the invention includes a contra-rotating propulsor system having an input shaft coupled to a pinion gear, a planetary gear set, a planet carrier, and a ring gear, where the planet carrier is coupled to a first output shaft and the ring gear is coupled to a second coaxial output shaft. The output shafts can each be coupled to propulsor elements such as propellers or waterjet impellers.

Another embodiment of the invention includes the propulsor system and further includes a first rotation altering element coupled to the planet carrier and a second rotation altering element coupled to the ring gear to re-distribute the energy generated by the output shafts.

Another embodiment of the invention includes the propulsor system and further includes a reversing clutch coupled to the input shaft or multiple clutches coupled to output shafts to reverse the rotation of the propulsor elements.

Another embodiment of the invention includes a single, variable speed electric propulsion motor, either DC or AC, that is configured to allow both an armature and outer opposed field windings mounted to a carrier to rotate freely and "counter-poised" against each other. The armature is connected to a center, internal output shaft, and the outer field windings carrier is connected a coaxial outer output shaft.

Another embodiment of the above described invention includes outer fixed field windings that can be energized to either resist or brake the rotation of either the armature or the field winding carrier, thereby transferring power from one to the other, and also allowing for direct electrical input or output to/from the system, thereby providing a hybrid capability.

BRIEF DESCRIPTION OF THE DRAWINGS

FIG. 1.1 is a schematic view of a first embodiment of a propulsor system having propellers as the propulsor elements;

FIG. 1.2 is a schematic view of a second embodiment of the propulsor system having waterjet impellers as the propulsor elements;

FIG. 2.1 is a schematic view of a third embodiment of the propulsor system having a reversing clutch coupled to the input shaft;

FIG. 2.2 is a schematic view of a fourth embodiment of the propulsor system including reversing and ahead clutches coupled to the output shafts;

FIG. 3.1 is a schematic view of a fifth embodiment of the propulsor system having braking mechanisms coupled to a planet gear and a ring gear of the propulsor system;

FIG. 3.2 is a schematic view of a sixth embodiment of the propulsor system having motor/generator feedback elements coupled to the planet gear and the ring gear and further coupled to a controller;

FIG. 3.3 is a schematic view of a seventh embodiment of the propulsor system having ring-type field windings disposed adjacent the ring gear and the planet gear and being coupled to a controller;

FIG. 3.4 is a schematic view of an eighth embodiment of the propulsor system having ring-type field windings disposed adjacent the ring gear and the planet gear and being coupled to a controller that is coupled to a power source of a ship;

FIG. 3.5 is a schematic view of a ninth embodiment of the propulsor system having ring-type field windings disposed adjacent the ring gear and the planet gear and being coupled to a hybrid controller that is coupled to a power source of a ship and a battery bank;

FIG. 3.6 is a schematic view of a tenth embodiment of the propulsor system having hydraulic pump and motor feedback elements coupled to the planet gear and ring gear;

FIG. 4.1 is a schematic view of an eleventh embodiment of the propulsor system incorporating a single main propulsion motor capable of free rotation of both a center armature and outer field windings with contra-rotating outputs taken off the a center armature shaft and an outer field winding carrier respectively;

FIG. 4.2 is a schematic view of a twelfth embodiment of the propulsor system and similar to the system shown in FIG. 4.1, but also having ring-type field windings disposed adjacent to an armature and adjacent to a field winding carrier and being coupled to a controller; and FIG. 4.3 is a schematic view of a thirteenth embodiment of the propulsor system having ring-type field windings disposed adjacent to an armature and adjacent to a field winding carrier and being coupled to a hybrid controller that is coupled to a power source of a ship and a battery bank

DETAILED DESCRIPTION OF THE PREFERRED EMBODIMENTS

With reference to FIGS. 1.1 to 4.3, a contra-rotating propulsor system 10 is provided having various embodiments described herein. With reference to FIG. 1.1, the system 10 includes a main power source or prime mover 11 that is configured and arranged to drive an input shaft 12 in a first rotary direction R1. The prime mover 11 and input shaft 12 drives the system through the use of a pinion gear 13, a plurality of planet gears 14, a planet carrier 15, and a ring gear 16. More specifically, the pinion gear 13 is coupled to an end of the input shaft 12 and is directly driven by the input shaft 12 such that the pinion gear rotates in the same rotary direction R1 as the input shaft 12.

The planet gears 14 are arranged circumferentially around and mesh with the pinion gear 13 and are each coupled to the planet carrier 15. The planet gears 14 can each rotate about their individual axes relative to the planet carrier 15. The planet carrier 15 holds the planet gears 14 in their orbital or radial position around the pinion gear 13, allowing the carrier 15 (and the planet gears 14 coupled thereto) to rotate around the pinion gear 13 and in the same rotational direction as the pinion gear 13 but at a different RPM depending on the relative diameter of the pinion gear 13 and planet gears 14. These gears 13 and 14 can be spur gears, single helical gears, or double helical gears. For the sake of simplicity, only single helical gears are shown in FIG. 1.1. While the planet carrier 15 rotates in the same rotational direction as the pinion gear 13, individual ones of the planet gears 14 rotate in the opposite rotational direction R2 due to meshing between the planet gears 14 and the pinion gear 13, which have external teeth or other external gearing arrangements that cause opposite rotation.

The planetary gear arrangement also contains the ring gear 16 that surrounds and meshes with the planet gears 14. This ring gear 16 is configured with internal teeth whereas the pinion gear and planet gears are configured with external teeth. As shown in FIG. 1.1, the rotational output from the ring gear 16 is opposite that of the pinion gear 13 and planet carrier 15. The output RPM of the ring gear 16 will be dependent on the diameters of the pinion gear 13, planet gears 14, and ring gear 16, as well as the relative RPMs of the pinion gear 13, planet carrier 15, and ring gear 16, which is further described below.

In some prior planetary gear arrangements, either the planet carrier or the ring gear is fixed in position, with the rotational output being taken off the unfixed planet carrier or ring gear. In this invention, both the planet carrier 15 and the ring gear 16 are allowed to rotate freely (or as described in further detail below, with either partial or full constraint.

The ring gear 16 is coupled to an external output shaft 17, and the planet carrier 15 is coupled to an internal output shaft 18. The output shafts 17 and 18 are axially concentric, and the opposite rotation of the ring gear 16 and planet carrier 15 creates dual and contra-rotating output paths through the output shafts 17 and 18. Each of these output shafts 17 and 18 is therefore "counter-poised" against the other through the planetary gearing. The power output of each shaft 17 and 18 will therefore be determined by the diameters of the pinion gear 13, planet gear 14, and ring gear 16, in conjunction with the torques applied by contra-rotating forward propulsor element 19 and aft propulsor element 20, further described below.

With reference to FIGS. 1.1 and 1.2, the forward propulsor elements 19 and 23 are respectively coupled to the external output shaft 17, and the aft propulsor elements 20 and 24 are respectively coupled to the internal output shaft 18. As shown in FIG. 1.1, the propulsor elements 19 and 20 can be in the form of forward and aft propellers 21 and 22, respectively. As shown in FIG. 1.2, the propulsor elements 19 and 20 can be in the form of forward and aft waterjet impellers 23 and 24, respectively. Because the propulsor elements 19 and 20 are coupled to the external and internal output shafts 17 and 18, respectively, the propulsor element 19 and 20 are contra-rotating.

In the case of waterjet impellers 23 and 24, these devices typically have a unidirectional flow of water through the waterjet and incorporate a self-contained reversing and steering capability through the use of steering nozzles and reversing buckets.

The contra-rotating nature of the propulsor elements 19 and 20 creates an increased efficiency in marine propulsion. The system 10 described above can also have reduced size and weight relative to conventional reduction gear and propeller systems known in the art, because the use of multiple planetary gears 14 with multiple torque transmission paths (one for each planet gear 14) allows each of the individual planet gears 14 to be smaller and shorter in axial length relative to traditional reduction gear and propeller systems. The size and weight of the planetary gears 14 can also be reduced as a result of the contra-rotation of the planet carrier 15 and ring gear 16 that effectively produce a greater reduction gear ratio using smaller gears to reduce size and weight of the system.

The system 10 can also provide equivalent thrust to a traditional propeller system while using propulsor elements 19 and 20 that have a smaller diameter relative to a traditional system, because total thrust output will be provided by the two contra-rotating propulsor elements 19 and 20.

Moreover, the system 10 results in reduced cavitation relative to a traditional system. Cavitation can be reduced by selecting the diameter, RPM, number of blades, and blade shape of each of the two contra-rotating propulsor elements 19, 20 specifically for the flow pattern, flow velocity, and flow direction that each of the two elements 19, 20 is exposed to throughout the operating range. This capability also allows for further increased efficiency and reduced cavitation, vibration, and noise.

Furthermore, by employing contra-rotating propulsor elements 19, 20 configured in an axial arrangement, and by proper design of the aft (downstream) propulsor 20 (diameter, number of blades, blade pitch/angle, blade shape, etc.), the system 10 allows for the recovery of rotational energy imparted to the water by the forward (upstream) propulsor 19.

In another form, and with reference to FIG. 2.1, the system 10 can include reversing capability. In this form, the system can include integral clutches 25 and 26. Clutch 25 is disposed on input shaft 12, while clutch 26 is disposed on an idler gear 27 that meshes with gears of clutch 25. The clutches 25 and 26 are synchronized and controlled in such a way as to allow the rotation of the pinion gear 13 to be reversed by reversing the rotation of the portion of the input shaft 12 that is coupled to the pinion gear 13.

With reference to FIG. 2.2, the reversing capability of the system can be provided in another form where the output shafts 17 and 18 can each be coupled to either the planet carrier 15 or ring gear 16. In this form, the internal output shaft 18 is capable of being connected to either the planet carrier 15 or ring gear 16 via clutches 27 and 28. More specifically, clutch 27 is an ahead clutch, and selectively couples the internal output shaft 18 to the planet carrier 15. Clutch 28 is a reversing clutch, and selectively couples the internal output shaft 18 to the ring gear 16. Similarly, the external output shaft 17 is capable of being connected to either the planet carrier 15 or the ring gear 16 via clutches 29 and 30. More specifically, clutch 29 is an ahead clutch, and selectively couples the external shaft 17 to the ring gear 16. Clutch 30 is a reversing clutch and selectively couples the external shaft 17 to the planet carrier 15. Clutches 27 and 29 can be engaged at the same time to drive the output shafts 17 and 18 in the directions described above. To reverse the direction of the output shafts 17 and 18, clutches 28 and 30 can be engaged.

The above reversing concepts are equally applicable to the propeller embodiment of FIG. 1.1 or the waterjet impeller embodiment of FIG. 1.2 and provide significant advantages. In addition to advantages described above in relation to the system of FIGS. 1.1 and 1.2, there is increased flexibility and applicability by allowing direct reversing of the contra-rotating propulsor elements 19 and 20. The clutches 25 and 26 coupled to the input shaft 12, and shown in FIG. 2.1, can allow for disengagement of the prime mover 11 from the remainder of the system 10. Similarly, the clutches 27, 28, 29, 30 allow for disengagement of the propulsor element 19 and 20 from the remainder of the system 10. Furthermore, by using the clutches 27, 28, 29, 30, the reversing capability of the system 10 can be implemented without the use of idler gears, thereby increasing the efficiency of the system.

Turning now to FIGS. 3.1 to 3.6, the system 10 can be provided with differential capabilities. The planetary gearing arrangement described above can similarly apply. One configuration of a differential contra-rotating propulsor system 10 is depicted in FIG. 3.1. This system contains the same basic elements as described in reference to FIGS. 1.1 and 1.2 above, but further includes a set of fully engaging or slipping clutch type brakes 31 and 32 attached to the planet carrier 15 and the ring gear 16, respectively.

In operation, either one or the other of the clutch brakes 31 and 32 is either partially or fully engaged, thereby restraining or stopping the rotation of the engaged element (either the planet carrier 15 or the ring gear 16). The result is that a portion or all of the input power is re-directed to the unrestrained output element. This "differential" capability allows for the re-distribution of power from one output shaft to the other so as to optimize the efficiency of the system throughout the operating range.

With reference to FIG. 3.2, a more flexible and versatile configuration of this same "differential" capability includes the replacement of the clutch brakes 31 and 32 described above with one or more sets of electrical "feedback" elements 33 and 34 that are engaged with the planet carrier 15 and the ring gear 16, respectively.

As shown in FIG. 3.2, each of the elements 33 and 34 would be an electric motor/generator configured and connected such that while one set was energized as a generator, the other set would function as a motor. The electrical feedback elements 33 or 34 operating in generator mode act as restraining devices and the electrical power output from these generators can be "fed back" to the other of the electrical elements 33 or 34, which would function as motors.

This configuration would allow for more effective and efficient transfer of power from the restrained output shaft to the unrestrained output shaft. These electrical feedback elements 33 and 34 would be capable of being energized so that power transfer from one of the output shafts 17 or 18 to the other of the output shafts 17 or 18 could occur in either direction and over a power range within the capabilities of the installed electrical feedback elements 33 and 34. The degree of "restraint" imposed by the generators 33 or 34 and the corresponding amount of "fed back" power through the motors 33 or 34 and opposite turning output shafts 17 and 18 would be established by an electrical controller 35 that could be programmed to adjust the distribution of power so as to maximize operating efficiency of the entire system.

The electrical feedback elements 33 and 34 could be configured as one or more sets of elements on the same planetary gear depending on space, weight, and cost constraints as well as desired differential power capabilities. For instance, the feedback elements 33 and 34 could each be a single element coupled to the carrier 15 and ring gear 16, respectively, or the elements 33 and 34 could each be a pair of elements coupled to the carrier 15 and ring gear 16, respectively, or three or more elements could be used. The number of elements for each of the feedback elements 33 and 34 can be determined, in part, based on space, weight, and cost considerations.

With reference to FIG. 3.3, an alternative to the motor/generator electrical feedback elements 33 and 34 depicted in FIG. 3.2 can be in the form of ring-type motor/generator field windings 36 and 37 on the perimeter of both the planet carrier 15 and ring gear 16, respectively. These ring-type field windings 36 and 37 can be energized similar to the motor/generators 33 and 34 depicted in FIG. 3.2 to achieve the same "resistive" and "feedback" effects, but without the mechanical losses that can be associated with the additional gear meshes that exist between the electrical feedback elements 33 and 34 and the planet carrier 15 and ring gear 16, respectively, shown in FIG. 3.2.

With reference to FIG. 3.4, a further enhancement or capability of the electrical feedback elements described above includes an outside power source 38 that the motor/generator elements 36 and 37 are connected to. The power source 38 can be in the form of generator power or batteries. The motor/generator elements 36 and 37 can be connected to the power source 38 through the control device 35, such that the contra-rotating output shafts 17 and 18 could be powered independently via electrical power alone from the power source 38. This could be particularly useful when operating at low power/loitering speeds and would allow operation without the prime mover 11 in operation.

The above depiction in FIG. 3.4 illustrates the motor/generator elements in the form of the field windings 36 and 37, but could also apply to the electrical feedback elements 33 and 34 described with reference to FIG. 3.2. It will be appreciated that further reference to the motor/generator elements 36 and 37 can similarly apply to the electrical feedback elements 33 and 34.

With reference to FIG. 3.5, the feedback elements 36 and 37 described above could also be connected to a hybrid external electrical control device 39 that would allow the entire system to be used in a "hybrid" fashion such that electrical power from the element(s) 36 and 37 acting as generators could be used to either charge storage batteries 40, connected to the hybrid controller 39, or supply supplementary power to the ship's power source 38, or conversely, either the ship's onboard electrical power from the power source 38 or ship's storage batteries 40 could be used to supply additional "boost" power to the propulsion system 10.

With reference to FIG. 3.6, in another form, the electrical feedback elements 36 and 37 described above could be replaced by hydraulic feedback elements 41 and 42 in the form of hydraulic pump/motor elements. In this case, the hydraulic feedback elements 41 and 42 would use hydraulic fluid as a means of transferring power from one output element to the other.

Each of the above described "differential" embodiments can be combined with the reversing embodiments of FIGS. 2.1 and 2.2 described above to provide the same advantages described in reference thereto.

Turning now to FIGS. 4.1 to 4.3, the system 10 can be configured as a purely electrical device by replacing the freely rotating planetary gear arrangement with a freely rotating electric motor 40. In these embodiments the system 10 becomes somewhat simpler but possesses some or all of the same characteristics described above.

The most basic form of this embodiment is depicted in FIG. 4.1 where a variable speed electric motor 50, which is either AC or DC is configured with slip-ring electrical inputs 52 so as to allow for the free rotation of an armature 54 and the outer field windings 56 which are attached to a rotating field winding carrier 58. In this embodiment, the internal output shaft 18 is connected to the armature 54 and rotates in the first rotational direction R1. The external output shaft 17 is connected to the outer field winding carrier 58 and rotates in the opposite direction R2. The armature 54 and the field winding carrier 58 are therefore counter-poised against each other and are free to rotate, restrained generally only by the torque imposed by the connected propulsor elements 19 and 20, which are connected to the external output shaft 17 and internal output shaft 18, respectively. The output horsepower of the system is increased or decreased by varying the input electrical power to the motor 50 through an electrical controller 60.

FIG. 4.2 depicts a modified version of the system depicted in FIG. 4.1 and incorporates a differential capability by imposing feedback elements in the form of additional field windings 62 on both the armature 54 and the motor field winding carrier 58. These field windings 62 can be either energized as generators, thereby imposing a restraint on the rotating element (the carrier 58 and or armature 54), or energized as motors, thereby supplementing or adding to the rotational energy of the rotating element. In this manner the differential capability works similar to the differential elements depicted in FIG. 3.4, with the differential distribution of power to each of the output shafts 19 and 20 being controlled by the electrical controller 60.

FIG. 4.3 depicts a system similar to that depicted in FIG. 4.2 but with the addition of Hybrid elements in the form of batteries 64 connected to the controller 60.

Each of the above field windings 62, field windings 56, or slip-ring electrical inputs 52 can also be referred to as rotational altering elements.

The above embodiments relating to the "differential" concepts illustrated in FIGS. 3.1 to 3.6 and 4.1 to 4.3 provide a variety of additional advantages. The above described brakes 31 and 32, electrical feedback elements 33 and 34, field winding feedback elements 36 and 37, hydraulic feedback elements 41 and 42, field windings 56, and field windings 62 that provide restraining capability allow for the controlled distribution of power between the contra-rotating output shafts 17 and 18 thereby giving the system 10 a "variable differential" capability. Moreover, these elements can be configured in size and quantity to provide a range of power re-distribution or "differential" capability. These elements can be connected to allow power to be re-distributed in either direction between the contra-rotating output shafts 17 and 18.

The above described hybrid capabilities can provide power generation to either charge the shipboard batteries 40 or 64, or supply ship service power directly. This also provides the ability to use power from the batteries 40 or 60, or the power source 38, to provide direct electrical power to the contra-rotating shafts 17 and 18 without having to use larger propulsion engines or motors such as the prime mover 11. The batteries 40 or 60, or power source 38, can provide additional boost or acceleration. Additionally, the electrical feedback elements can be used as either a primary or backup starting motor for the prime mover 11. The above described "differential" capabilities provide a robust solution to allow for the efficiency of the system 10 to be optimized at all operating points throughout the operating range of the system 10.

The above described embodiments of the system 10 can have numerous applications. Examples include a similarly configured system on a ship assist tug. In this case, the differential contra-rotating propulsor system can be designed such that the freely rotating planet carrier 15 and ring gear 16, without restraint applied thereto, could be optimized for maximum Bollard Pull (zero speed pulling power). When operating in a loitering condition at engine idle speeds, more of the engine output power could be re-directed to the aft (normally lower pitch) propulsor 20 driven off of the planet carrier 15 thereby reducing the torque on the prime mover 11 and improving efficiency in the process. Alternatively, the embodied Hybrid configuration of the invention could operate in electric mode, where ship's electrical power from the power source 38 or batteries 40 or 60 could be used to provide loitering capability without the use of the prime mover 11.

In the case of a sport fishing boat or a military patrol boat, the "free running" (without restraint) system 10 could be optimized for top-end speed. In the case of a sport fishing boat that operates for significant periods at trolling speeds, the power from the prime mover 11 can be "redirected" to the lower pitch, aft propulsor 20 thereby reducing torque on the engine and increasing efficiency. Similarly to the ship assist tug described above, this trolling mode could also be accomplished through the use of the Hybrid capability, using solely electrical power from the power source 38, the batteries 40, or both for propulsion.

Military patrol boats operate in a similar fashion with needs for relatively short bursts at top-end speed and significant time spent at loiter speeds. A similar, more efficient distribution of propulsion power could be used to meet these requirements.

The proposed invention configured as a waterjet with contra-rotating impellers 23 and 24 also addresses a modern challenge with newer, high speed hullforms designed to operate in shallow, coastal environments. These hullforms favor the use of waterjets in order to maintain minimum draft and achieve higher efficiency when operating at speeds greater than 30 knots. The use of a waterjet configuration of the proposed invention will allow equal or greater thrust to be delivered through a smaller diameter waterjet without incurring the negative effects of cavitation. This saves both space (transom area required for the waterjet) and weight due to the use of a smaller, more axially oriented unit.

Other applications, such as LNG powered vessels, where there exists a requirement to "absorb" boil-off gas energy, even while loitering or tied to a pier, can be addressed using the proposed system. Electrical power can be consumed through the use of the Hybrid capability where the propulsor elements 19 and 20 can be driven by the ship's LNG power source 38 to "oppose" each other, thereby expending energy without producing thrust.

The system 10 is unconstrained in size and output power and can therefore be applied to larger ships providing similar benefit.

While the above description constitutes the preferred embodiment of the present invention, it will be appreciated that the invention is susceptible to modification, variation and change without departing from the proper scope and fair meaning of the accompanying claims.

What is claimed is:

1. A system for providing propulsion to a marine vessel, the system comprising:
   a rotatable armature defining a first longitudinal axis;
   a rotatable carrier surrounding the armature;
   a plurality of outer field windings mounted to the carrier;
   an internal output shaft coupled to the armature;
   an external output shaft coupled to the carrier surrounding the internal output shaft;
   a forward propulsor element coupled to the external output shaft;
   an aft propulsor element coupled to the internal output shaft; and
   at least one rotation altering element coupled to at least one of the carrier or the armature and being selectively activatable for altering the rotational speeds of the carrier and the armature.

2. The system of claim 1, further comprising at least one slip-ring electrical input.

3. The system of claim 2, wherein the at least one slip-ring electrical input is coupled to a controller that varies input electrical power to the slip-ring electrical input.

4. The system of claim 1, wherein the at least one rotation altering element comprises a first rotation altering element coupled to the carrier and a second rotation altering element coupled to the armature, wherein the first and second rotation altering element are each coupled to a controller, and the first and second rotation altering elements are each controllable by the controller to be energized as generators to impose a restraint on rotation or as motors to supplement rotational energy.

5. The system of claim 4 further comprising batteries connected to the controller, wherein the batteries are capable of both storing energy from the first or second rotational altering element acting as a generator and providing energy to the first or second rotation altering element acting as a motor.

6. The system of claim 4, wherein at least one of the first or second rotation altering elements comprises field windings.

7. The system of claim 1, wherein the at least one rotation altering element comprises field windings.

8. The system of claim 1, wherein the armature rotates in a first rotational direction, and the carrier rotates in a second rotational direction.

9. The system of claim 1, wherein the armature and the carrier are counter-poised against each other.

10. The system of claim 1, wherein the armature and the carrier are freely rotating.

11. The system of claim 1, wherein the armature and the carrier combine to define an electric motor, the electric motor coupled to an electrical controller that provides power to the motor.

12. A system for providing propulsion to a marine vessel, the system comprising:
    a rotatable armature defining a first longitudinal axis;
    a rotatable carrier surrounding the armature;
    a plurality of outer field windings mounted to the carrier;
    an internal output shaft coupled to the armature;
    an external output shaft coupled to the carrier surrounding the internal output shaft;
    a forward propulsor element coupled to the external output shaft;
    an aft propulsor element coupled to the internal output shaft; and
    at least one slip-ring electrical input coupled to the carrier.

13. The system of claim 12, further comprising at least one rotation altering element coupled to at least one of the carrier or the armature and being selectively activatable for altering the rotational speeds of the carrier and the armature.

\* \* \* \* \*